Jan. 9, 1973   G. A. CAMPBELL   3,709,965
FORMING SKIN COVERED FOAM BY EXPANDING A POLYURETHANE MIXTURE
CONTAINING EXCESS BLOWING AGENT IN A CLOSED MOLD
Filed March 4, 1971

INVENTOR.
Gregory A. Campbell
BY
George A. Growe
ATTORNEY

United States Patent Office 3,709,965
Patented Jan. 9, 1973

3,709,965
FORMING SKIN COVERED FOAM BY EXPANDING A POLYURETHANE MIXTURE CONTAINING EXCESS BLOWING AGENT IN A CLOSED MOLD
Gregory A. Campbell, Romeo, Mich., assignor to General Motors Corporation, Detroit, Mich.
Filed Mar. 4, 1971, Ser. No. 121,046
Int. Cl. B27d 27/04
U.S. Cl. 264—45                3 Claims

ABSTRACT OF THE DISCLOSURE

The core density and skin thickness of a molded integral skin foam polyurethane article are varied independently by employing a measured excess of fluorocarbon blowing agent in the catalyzed polyisocyanate-polyol mixture over the maximum amount of blowing agent required to produce a stable, free-rise foam. The exothermic heat of reaction vaporizes the liquid blowing agent to generate substantial pressure, depending upon the amount of blowing agent, within a closed mold. The pressure exceeds the vapor pressure of the blowing agent at the relatively cool mold surfaces, causing the foam in this region to collapse and form a skin up to one to three millimeters in thickness. The core density of the article, on the other hand, is dependent substantially only upon the quantity of polymerizable mixture charged to the mold. The polymerizable mixture is not capable of forming a stable, free-rise foam because of the blowing agent content.

---

This invention relates to the formation of molded integral skin, cellular polyurethane articles. More particularly, it relates to a method of forming cellular polyurethane articles with an integral skin wherein the thickness of the skin and the density of the cellular core may be varied independently.

Integral skin foam urethane articles have been molded by reacting suitable formulations of polyisocyanates and polyester polyols or polyether polyols in a closed mold. If suitable catalysts are incorporated in the formulation, the heat of reaction vaporizes a liquid blowing agent to generate an expanding foam within the mold cavity. The foam is stabilized by a surfactant so that the cellular mass continues to expand until it completely fills the mold. In accordance with one prior art procedure, an integral skin is formed on the article by cooling a mold surface to prevent foaming of the polymerizing mixture in a thin layer at the mold wall. Another procedure for producing an integral skin is to pack or overload the mold with the polymerizable formulation so that substantial pressure is generated by the vaporization of the blowing agent and the expansion of the mixture. If the mold wall is somewhat cooler than the interior of the hot polymerizing mass, the blowing agent does not expand in the region of the mold surface. The pressure in the mass at the mold surface is greater than the vapor pressure of the blowing agent. In this way a thin, substantially noncellular integral skin is formed on the surface of a cellular body.

The difficulty with simply cooling the surface of the mold is that it may inhibit polymerization of the formulation near the mold wall causing undesirable surface characteristics in the molded article. In any event, such a cooling process is usually too slow to produce a skin of substantial thickness by preventing foam formation. On the other hand, a mold can readily be overloaded with foamable mixture in an amount of 50% to 200% by weight or more in excess of that required to just fill the mold cavity by the normal free expansion of the blowing agent in the mixture. In this manner a relatively thick skin may be formed. However, the overloading or packing of the mold results in a substantial increase in the density of the foam. When more foamable, polymerizable mixture is added to a mold of given cavity volume, the density of the molded article must necessarily increase. As a result workers have heretofore been unable to independently control the density of the foam and the thickness of the skin, and to produce a relatively low density foam having a skin of substantial thickness of the order of one to three millimeters.

Accordingly, it is an object of the present invention to provide a method of molding an integral skin, cellular urethane article wherein the density of the cellular core portion of the article and the thickness of its integral skin may be varied independently.

It is another object of the present invention to provide a molded integral skin, cellular polyurethane article wherein the cellular core portion is of relatively low density, such as about three to ten pounds per cubic foot, and the integral, substantially noncellular skin is of the order of one to two or more millimeters in thickness.

It is a more specific object of the present invention to provide a method of molding an integral skin, cellular polyurethane article using a formulation of suitable isocyanate containing constituents, polyol containing constituents, active catalysts and volatile liquid blowing agents, wherein the amount of the liquid blowing agent is varied within suitable limits so that independent control is had over the density of the cellular core portion of the article and the thickness of the integral skin.

In accordance with a preferred embodiment of my invention, these and other objects are accomplished by first providing a polymerizable formulation of polyurethane producing materials. The components of the formulation may suitably be selected from conventional, commercially available chemicals. In general, the formulation comprises an isocyanate group containing constituent having at least two isocyanate groups per molecule. The formulation also contains one or more polyether polyols or polyester polyols, preferably having molecular weights in the range of 200 to 8,000. Of course, as is now well known, the polyisocyanate reacts with the polyol to produce a relatively high molecular weight resin characterized by a large number of urethane bonds. A catalyst, such as triethylene diamine, and/or dibutyltin dilaurate, is also employed as well as a suitable foam stabilizing surfactant, preferably of the commercially available silicone type. The foamable and polymerizable formulation will also contain a volatile liquid foaming agent, such as certain of the Freon type fluorohalocarbon propellants. In accordance with known polyurethane foam technology, the concentration and identity of the catalyst and the identity and the molecular weight distribution of the polyols employed are chosen so that upon mixing of the above ingredients and charging to a suitable mold, the polymerization reaction proceeds at a sufficiently rapid rate. Heat is quickly generated within the reaction mixture and liquid blowing agent is vaporized to produce a stable foam which expands to fill the mold.

Elements of a formulation of the type described are mixed, preferably at a temperature of 70° to 85° F., and a measured quantity charged into a closable mold having a cavity of desired predetermined configuration. Preferably, the mold is preheated to a temperature of about 100 ably, the mold is preheated to a temperature of about 100° to 175° F. The reactive polyol and polyisocyanate combine rapidly and exothermically in the presence of the catalyst. The polymerization reaction is further enhanced by the warmth of the preheated mold. The heat of reaction, however, soon raises the temperature of the polymerizing mixture above that of the enclosing mold. Liquid foaming agent is vaporized to produce a foam or froth which expands to fill the mold cavity. As the expanding foam completely fills the mold the heat of reaction continues to heat the blowing agent, resulting in a substantial pressure increase in the mold. In general, the larger the amount of blowing agent originally added, the greater the pressure. While the pressure is relatively uniform throughout the foaming mixture, the temperature is greater in the center portion and lower at the mold surface. In the relatively cool mold surface area of the polymerizing formulation the pressure generated by vaporized blowing agent exceeds its condensation pressure. The blowing agent in the surface areas of the increasingly viscous mass condenses under the pressure. Under these circumstances the foam collapses near the mold wall as the blowing agent condenses and a skin is formed. The polymerization reaction continues throughout the newly formed article, including the skin region, but large cells are not reformed in the skin region.

In accordance with this foam generating and integral skin making mechanism the density of the foam core is dependent mainly upon the amount of material charged to the mold. However, the thickness of the skin associated with a given core can be controlled by varying the amount of blowing agent used.

I have found that this procedure will produce integral skin polyurethane foams of varying densities having integral skins of up to one to two or more millimeters in thickness. The amount of liquid blowing agent that is employed to produce thick integral skins of this magnitude is about 1.3 to three times the maximum amount of blowing agent that can be incorporated into the polymerizable mixture of polyisocyanate, polyol, catalyst and the like, and produce a stable, free-rise foam in an open mold having a density of about 1½ to ten pounds per cubic foot. In the closed mold the excessive quantity of liquid blowing agent, which would cause a free-rise foam to collapse, produces an integral skin of desired thickness without leading to a significant concomitant increase in the density of the cellular core body. Moreover, this is accomplished without obtaining high pressures in the closed mold, e.g., greater than about two atmospheres gauge pressure.

Other objects and advantages of my invention will become more apparent from a detailed description which follows. Reference will be made to the drawings, in which.

A few specific examples will more clearly illustrate the practice of my invention.

EXAMPLE I

A three-component formulation of polyurethane foam precursor materials was prepared as follows, all being in terms of parts by weight.

Component 1

91.0 parts of a copolymer triol having a hydroxyl number of 28 and a molecular weight of about 6,000 (Union Carbide NIAX Polyol 31–28);
5.0 parts trichloromonofluoromethane (normal boiling point, 78° F.);
15.0 parts trichloro-1,2-trifluoroethane (normal boiling point, 117° F.);
0.75 part silicone surfactant (Union Carbide Y–6304);
0.1 part dibutyltin dilaurate.

Component 2

9.0 parts polyetherdiol having a hydroxyl number of 1190 and containing 100% primary hydroxyl groups (Union Carbide E–327);
0.5 part triethylene diamine in dipropylene glycol (Dabco LV–33, Houdry).

Component 3

32.3 parts a mixture of a diol and a triol of propylene oxide based polyether, each capped with 80% 2,4-, 20% 2,6-toluene diisocyanate. (This isocyanate-capped polyether prepolymer mixture had a free —NCO content of 32.5% by weight.)

The above three components were mixed in proportions of 15.2:1.0:3.6 by weight, respectively, in a commercial foam mixing machine constructed to accurately mix three variable streams of liquid components fed from three separate holding vessels. The machine was adjusted to deliver a total of five pounds of mixed formulation per minute. The mixed formulation contained approximately 13.7% by weight fluorocarbon propellant liquids. This was found to be substantially the maximum amount of blowing agent tolerable in the polymerizable mixture to produce a stable, free-rise foam having a density of about 4.5 to five pounds per cubic foot. This is to say that the above-described formulation will polymerize starting at about normal room temperature with an exothermic heat of reaction to produce a foam which is structurally stable. During the polymerization the mixture expands and eventually gels to produce a structurally sound cellular structure having a density of about 4.5 to five pounds per cubic foot. However, if an additional increment of blowing agent is employed, too much vapor is generated for this particular polymerizing, increasingly viscous mass to hold and the foam collapses. An essentially noncellular polyurethane mass is thereby attained.

Figure 1:
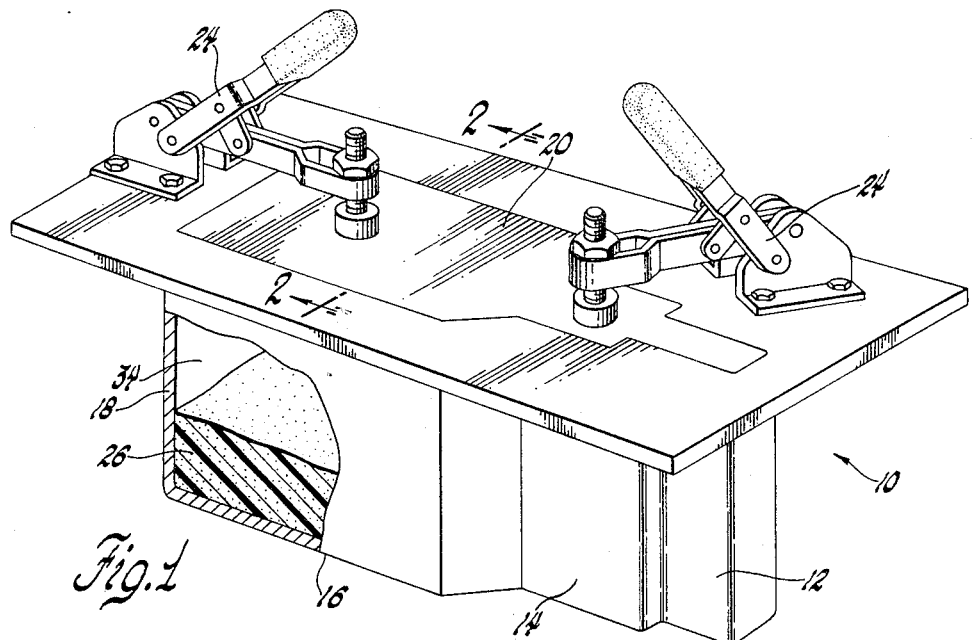
FIG. 1 is a perspective view, partially broken away, of a closed mold in which, in accordance with my process, a foamable polyurethane formulation is just beginning to expand.

A mold was prepared as shown at 10 in FIG. 1 having three interconnected cavity sections of increasing thickness. The thinnest section 12 defined a cavity about one-half inch across, section 14 defined a cavity about one and one-half inches across, and section 16 defined a cavity 34 three and one-half inches across. Each of the cavity portions of section 12, 14 and 16 of mold 10 was about three and one-quarter inches deep. The mold wall 18 was uniformly about one-quarter inch thick. The mold was provided with a removable lid 20 fitted to rest on shoulder 22 (best seen in FIG. 2) and be clamped in position by clamps 24.

The foamable mixture described above was charged to mold 10 from the mixing machine, not shown, for a period of six seconds. About one-half pound of the mixture was added. The mold had been preheated in an oven to 145° F. The polymerizable mixture charged from the foam mixer was at 78° F. When foamable composition had been charged to mold 10, lid 20 was placed on the mold and clamped shut and the closed mold returned to the oven at 145° F. for five minutes. After five minutes the mold was removed from the oven and the molded product demolded and allowed to stand at room temperature for twenty-four hours before further handling and testing.

The broken-away portion of FIG. 1 shows the polymerizing and foaming mixture 26 at a time just after the mixture has been charged to the mold 10 and the mold closed. It is seen that the mixture 26 is just starting to foam and expand in the mold cavity 34. Although the closed mold will permit air to escape, it is tight as far as the foaming mixture is concerned.

Figure 2:
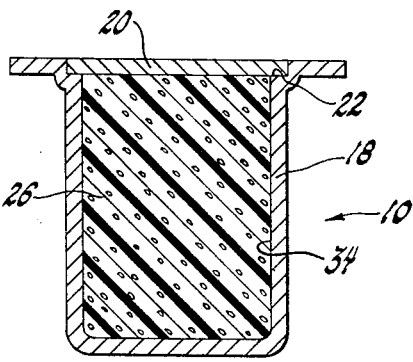
FIG. 2 is a sectional view along line 2—2 of FIG. 1 illustrating the foaming mass at a later time when the foam has just filled the mold cavity.

In FIG. 2 the foaming mixture 26 has expanded to completely fill the mold cavity. At this point the formation of an integral skin may begin if suitable conditions exist.

Figure 3:
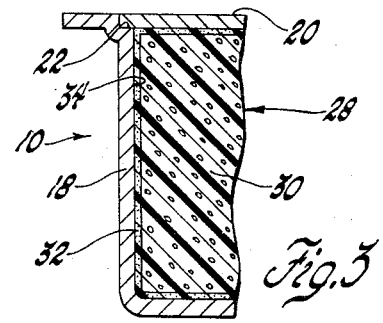
FIG. 3 is a partial sectional view similar to that of FIG. 2 except that it depicts the state of the polymerizing mass at a still later time when the integral skin has been formed.

FIG. 3 illustrates a molded urethane article 28 with a cellular core portion 30 and a suitably formed, substantially noncellular, integral skin 32 ready for demolding from mold 10.

The molded foam body produced by the above procedure was found to have a density of about 4.7 pounds per cubic foot. However, unlike the artcile 28 shown in FIG. 3, it contained substantially no skin. An irregular, noncoextensive skin of no more than 0.4 millimeter in greatest thickness was observed on some portions of the molded article. The molding conditions and the amount of formulation charged to the mold were unsuitable for the formation of a coextensive, integral skin of substantial thickness.

The molding procedure described above was repeated four times, with varying increasing amounts of the same polymerizable formulation being added to the mold 10, preheated to 145° F. Foamable, polymerizable mixture was added from the foam mixing machine for periods of nine seconds, twelve seconds, fifteen seconds and eighteen seconds, respectively, in the four molding experiments. When increasing amounts of moldable formulation (one and one-half to three times the loading or packing of the original experiment) were foamed and cured in the closed mold, it was found that the molded articles contained a cellular body with an integral, substantially noncellular skin. The densities of the core foam and thicknesses of the integral skin are summarized below for the respective periods of charging the foamable mixture from the foam mixing machine.

| Charge time (seconds) | Foam density (pounds per cubic foot) | Skin thickness (millimeters) |
| --- | --- | --- |
| 9 | 6.8 | 1.1 |
| 12 | 8.8 | 1.8 |
| 15 | 9.9 | 2.2 |
| 18 | 16.0 | 2.6 |

It is seen that in order to obtain appreciable skin thicknesses of the order of two millimeters it is necessary to charge two to three times as much of the polymerizable mixture to mold 10, as was charged in the original experiment. By so doing, an integral, noncellular skin is obtained but the density of the cellular body portion of the molded article is substantially proportionately increased. For many applications, such as automobile interior components, a foam density of about four to eight pounds per cubic foot is preferred. Higher density foams are too hard and rigid. They can be tolerated only to obtain desired skin thickness and require excessive amounts of expensive materials. A skin thickness of about two millimeters or slightly higher is preferred in automobile interior trim applications. It has suitable strength to withstand wear and tear from normal passenger activity. Moreover, there is ample skin material with a thickness of two millimeters to permit the molding of a grain or other design effect into the skin.

EXAMPLE II

The above-defined three-component polymerizable urethane formulation was modified by increasing the content of the two fluorocarbon blowing agents. A total of 6.66 parts trichloromonofluoromethane and 20 parts trichloro-1,2-trifluoroethane were used, together with the original proportions of the ingredients in Component 1. No change was made in the amounts of the reactive polyisocyanate and polyol components or the catalyst or surfactant constituents. It was desired simply to increase by 33% the amount of blowing agent in the formulation without affecting the chemistry of the system beyond that resulting from the slight dilution.

The foam mixer was adjusted to incorporate a proportionately greater amount of Component 1 into the three-component mixture and still deliver the equivalent of the original five pounds per minute polymerizable and formable composition. Mold 10 was preheated in a temperature controlled oven to 145° F. The polymerizable mixture was delivered over a period of six seconds from the foam mixer to the mold at a temperature of 78° F. The mold was closed and placed in an oven at 145° F. for five minutes as described above. Thereafter the mold was removed from the oven, the foamed article demolded and allowed to stand for twenty-four hours at room temperature before further examination. The cellular molded body had an integral skin. The density of the cellular core portion was 4.2 pounds per cubic foot. The thickness of the integral skin on the thickest portion of the molded body was 1.7 millimeters. Thus, molded body was produced having a foam density similar to the density obtained in the first molded article of Example I wherein the same weight of formulation was added to the mold. However, in this case, the molded article had a coextensive integral skin substantially noncellular in nature and nearly two millimeters in thickness. The thickness of the skin in the thinner portions of the molded article were somewhat thicker. The foaming and self-skinning phenomenon in accordance with my process is believed to occur as follows.

Figure 4:
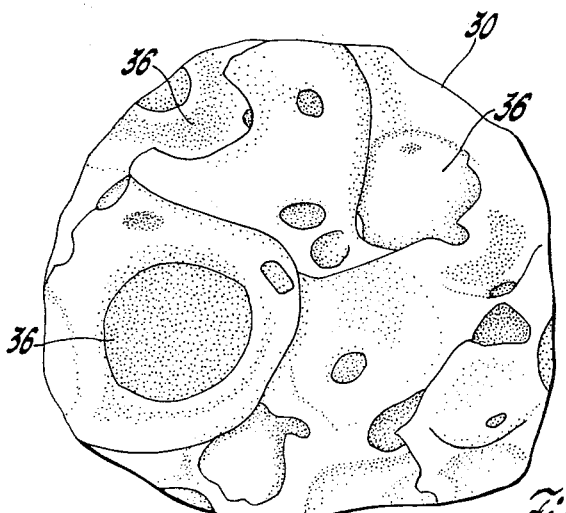
FIG. 4 is an enlarged view, based on an electron micrograph, of the cellular core section of the molded article in FIG. 3.
Figure 5:
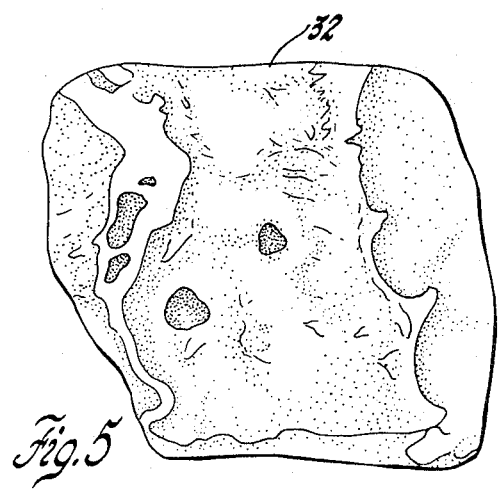
FIG. 5 is an enlarged view, based on an electron micrograph, of the skin portion of the mold article of FIG. 3.

When a foamable and polymerizable mixture is initially charged to the mold and the mold closed it soon begins to foam. The heat of reaction vaporizes some of the blowing agent. The inherent and increasing viscosity of the fluid polymerizing mixture and the activity of the surfactant cooperate to maintain most of the generated vapor with a stable expanding froth. Commencement of the foaming is depicted at 26 in FIG. 1. The foaming mass 26 quickly expands to completely fill the mold cavity. This stage is depicted in FIG. 2. As the material continues to polymerize and more heat is evolved, vaporization of blowing agent continues. Increasing pressure is exerted within the mold. The temperature in the more or less insulated center regions, particularly in the larger portions 34 of the mold cavity, increases above the temperature of the heated mold wall. However, despite the fact that the temperature in the cellular mixture is well above the normal boiling point of the blowing agent, the increased pressure causes previously vaporized blowing agent in the region of the relatively cool mold surface to condense. When the blowing agent condenses, substantially all of the cells in this outer or surface portion of the polymerizing mixture are destroyed and a generally noncellular, integral skin is formed. As the polymerization approaches completion the rate of evolution of heat decreases. By this time the cellular polymeric material in the core of the article has gained sufficient strength to maintain its structural integrity. In general, large numbers of cells are open and interconnected. Moreover, by this time the noncellular skin is sufficiently cured that it maintains its structure upon removal of the article from the mold. FIG. 3 depicts the molded article 28 after the integral skin 32 has been formed and it is sufficiently solid and strong to be demolded. In the examples of this specification, FIG. 3 depicts the state of the molded foam article 28 at about five minutes after the polymerizable formulation has been charged to the mold and the mold placed in an oven at about 100° to 170° F. FIGS. 4 and 5 are greatly enlarged representations of the large interconnected open cells 36 of body portion 30 of the molded article and the substantially noncellular microcellular skin portion 32, respectively.

When a mold of a given size is charged with a suitable amount of a polymerizable and foamable formulation so that upon foaming and curing a cellular body having a density of about one and one-half to ten pounds per cubic foot, and preferably about three to eight pounds per cubic foot, is produced, the thickness of the integral skin may be varied in accordance with my method by varying the amount of liquid blowing agent. Preferably, the amount of liquid blowing agent is varied from about one and one-third to about three times the maximum amount of blowing agent which may be incorporated in a given polymerizable formulation to produce a stable, free-rise foam having a density of one and one-half to ten pounds per cubic foot. In polyurethane foam technology a stable, free-rise foam is one which polymerizes and expands in an unconfined environment without collapsing due to overblowing to form a structurally self-sustaining foam body. Lesser amounts of blowing agent are generally ineffectual to produce an integral skin of substantial thickness because insufficient pressure is generated within the mold to condense vaporized blowing agent at the surface of the molded article. A greater amount of liquid blowing agent does not appear to result in markedly increased skin thickness over about three to three and one-half millimeters. It merely increases the cost of the formulation.

With a given amount of liquid blowing agent in the formulation, the density of a desired foamed article may, of course, be varied and controlled, as is accomplished in the prior art, by adjusting the weight of polymerizable formulations charged to the mold. For example, longer quantities of the formulation of this Example II (containing 33% more fluorocarbon than the formulation of Example I) were charged to mold 10 by feeding from the mixing machine for periods of nine seconds and twelve seconds, respectively, instead of the original six seconds. The filled molds were placed in a 145° F. oven for five minutes and finally cured at room temperature as described above. Integral skin cellular articles were produced having core densities of 5.7 pounds per cubic foot and 8.2 pounds per cubic foot, respectively. The skin thicknesses were 1.9 millimeters and 2.1 millimeters. Thus, for a given chemical formulation molded integral skin foam articles having densities ranging from four pounds to 8.2 pounds per cubic foot were obtained by simply varying the amount of formulation charged to the mold. Despite the charge in foam density integral skin thickness of the order of two millimeters was maintained. Conversely, for a given foam density the integral skin thickness can be varied by adjusting the amount of blowing agent within the above specified limits. Heretofore such independent control of skin thickness and core density has not been possible.

EXAMPLE III

The liquid blowing agent content of the formulation of Example I was increased by 100% by employing a total of ten parts of trichloromonofluoromethane and thirty parts trichloro-1,2-trifluoroethane, respectively, in Component 1. The three components were then mixed in the described foam mixing machine to provide the same proportions of reactive materials, catalysts and surfactants as in Example I. In other words, the amount of blowing agent was doubled without otherwise affecting the formulation. The formulation now contained twice the maximum amount of blowing agent tolerable in a stable, free-rise foam. This material was charged for six seconds to a mold 10 which had been preheated to 145° F. A molded foam body was produced by the procedure described in Examples I and II. The resulting article had a cellular core density of 3.5 pounds per cubic foot and an integral skin 2.1 millimeters in thickness.

The thickness of the integral skin produced in accordance with my method is also partly dependent on the thickness of the molded body and the mold temperature. The lower the mold temperature or the thinner the part, the greater the thickness of the integral skin. On the other hand, the higher the mold temperature or the greater the thickness of the part, the thinner the skin. For example, a formulation which was foamed and polymerized in the mold 10 depicted in FIG. 1, which was heated at 160° F., produced an integral skin foam article having a skin thickness of 1.4 millimeters in the three inch thick section, 1.8 millimeters in the one and one-half inch section, and 1.9 millimeters in the one-half inch section. When molded at 145° F., the formulation produced an article having skin thicknesses of 1.9 millimeters, 2.2 millimeters and 2.3 millimeters in the respective sections. These factors must be taken into consideration in the development of a suitable polymerizable and foamable formulation.

With respect to controlling skin thickness, my process depends largely upon the physical phenomenon of condensing a portion of a vaporized blowing agent in the mold surface region of a molded polymerizing formulation under pressure generated largely by the balance of the vaporized blowing agent. The effectiveness of the process in independently varying skin thickness is not a function of the specific chemical composition of the polymerizable urethane composition. However, the process is particularly useful in preparing integral skin, urethane foam bodies from compositions which contain the following components.

Conventional foamable polyurethane compositions contain diisocyanates such as 2,4- and 2,6-toluene diisocyanate, mixtures containing about 20% by weight 2,6-toluene diisocyanate and about 80% by weight 2,4-toluene diisocyanate, p,p'-diphenylmethane diisocyanate, 1,5-naphthalene diisocyanate, 1,6-hexamethylene diisocyanate and the like. These isocyanates may be added as such or they may be prereacted or coupled with a suitable polyether or polyester polyol to form an isocyanate terminated prepolymer as was done in the examples in the specification.

The component of the formulation reactive with the polyisocyanate constituent preferably is a polyether or polyester based polyol having a molecular weight in the range of about 200 to about 8,000. Usually mixtures of polyols containing varying molecular weights within this range are employed as was done in the specific examples herein to provide the desired viscosity of the polymerizable mixture and suitable physical properties in the final product.

Any suitable hydroxyl group terminated polyester may be used, such as, for example, the reaction product of a polycarboxylic acid with an excess of a polyhydric alcohol. Any suitable polycarboxylic acid may be used, such as, for example, adipic acid, sebacic acid, phthalic acid, terephthalic acid, maleic acid, malonic acid, thiodipropionic acid and the like. Any suitable polyhydric alcohol may be used, such as, for example, ethylene glycol, propylene glycol, butylene glycol, amylene glycol, glycerine, trimethyol propane, pentaerythritol and the like.

Any suitable polyhydric polyalkylene ether may be used, such as, for example, the condensation product of alkylene oxides and a polyhydric alcohol. Any suitable alkylene oxide may be used, such as, for example, ethylene oxide, propylene oxide, butylene oxide, amylene oxide and the like. It is preferred to employ polyhydric polyalkylene ethers prepared from alkylene oxides having from two to five carbon atoms, such as, for example, polypropylene ether glycol, polyethylene ether glycol, polybutylene ether glycol or mixtures thereof having a molecular weight of at least about 500. Moreover, the condensation product of the aforementioned alkylene oxides and a polyhydric alcohol having from two to four hydroxyl groups, such as, for example, ethylene glycol, propylene glycol, trimethylol propane, glycerol, triethanol amine, pentaerythritol and the like may be used.

As is known, the polymerization and foam forming reactions can be manipulated and controlled by selection of and variation of the amounts used of conventional catalysts. Examples of suitable reaction catalysts include triethylene diamine, dibutyltin dilaurate, stannous octoate, n-methyl morpholine and tetramethyl butane diamine.

The cell size and stability of the foam is controlled and aided by the addition of suitable surfactants, such as conventional silicone oils or polyglycol-silicone polymers. It is preferred that the Freon type, halogenated propellants be employed as blowing or foaming agents. The preferred blowing agents are those employed in the specific examples in this specification because they are suitable normal boiling temperatures and are substantially non-toxic.

The subject process is not considered applicable when water is employed to react with the isocyanate generating carbon dioxide for foaming.

Of course, as is well recognized in the art, reactive combinations of the above ingredients are kept separate and mixed together just before charging to a suitable mold. Typically, the mixture is charged to the mold at temperatures of 70° to 85° F. and the reaction proceeds spontaneously and exothermically. In general, it is preferred that the mold be preheated to a temperature of about 120° to 170° F. to allow the reaction to proceed at a suitable rate and still provide suitable skin formation at the mold walls. The exact selection of temperatures will, of course, depend upon the specific chemical formulas employed.

While my invention has been described in terms of a few preferred specific embodiments thereof, it will be appreciated that other forms will readily be adapted by one skilled in the art. Accordingly, the scope of my invention is to be considered limited only by the following claims.

What is claimed is:

1. In the process of producing a relatively low density, open cell polyurethane resin foam body by reacting a polyisocyanate with a suitable polyol in the presence of a catalyst and a liquid foaming agent which is vaporizable by the exothermic heat of reaction of said polyisocyanate and polyol, the improvement wherein a relatively dense microcellular polyurethane skin is formed on surface portions of said foam body, the thickness of said skin being generally independently controllable with respect to the density of said foam body, comprising providing a polymerizable mixture of a said polyisocyanate and polyol containing at least one and one-third times the maximum amount of said foaming agent that could be combined with the proportions of said polyisocyanate, polyol and catalyst in said mixture to produce a structurally stable, free-rise foam therefrom having a density in the range of about one and one-half to ten pounds per cubic foot, said polymerizable mixture thus not being capable of forming a stable, free-rise foam because of its said content of said foaming agent, adding a predetermined amount of said polymerizable mixture to a closable mold and immediately closing said mold, said mixture undergoing polymerization and evolving heat which vaporizes said liquid foaming agent and thereby expands the polymerizing mixture to completely fill the cavity of said mold and form a molded integral skin foam article therein, said predetermined amount of polymerizable mixture being sufficient to provide foam core bodies in said article having a density of about one and one-half to ten pounds per cubic foot, the said amount of said liquid foaming agent being such as to provide a microcellular skin on the surface portions of said foam body having a thickness of the order of one to three millimeters, and removing said article from said mold.

2. In the process of producing a relatively low density, open cell polyurethane resin foam body by reacting a polyisocyanate with a suitable polyol in the presence of a catalyst and a liquid foaming agent which is vaporizable by the exothermic heat of reaction of said polyisocyanate and polyol, the improvement wherein a relatively dense microcellular polyurethane skin is formed on surface portions of said foam body, the thickness of said skin being generally independently controllable with respect to the density of said foam body, comprising providing a polymerizable mixture of said polyisocyanate, polyol and catalyst containing about one and one-third to three times the maximum amount of said vaporizable liquid foaming agent that could be combined with the proportions of said polyisocyanate, polyol and catalyst in said mixture to produce a structurally stable, free-rise foam therefrom having a density in the range of about one and one-half to ten pounds per cubic foot, said polymerizable mixture thus not being capable of forming a stable, free-rise foam because of its said content of said foaming agent, adding a predetermined amount of said polymerizable mixture to a closable mold which has been preheated to a temperature of 100° to 175° F. and immediately closing said mold, said mixture undergoing polymerization and evolving heat, said liquid foaming agent vaporizing to expand the polymerizing mixture to completely fill the cavity of said mold, said predetermined amount of polymerizable mixture being sufficient to provide a molded cellular polyurethane body having a core density of about one and one-half to ten pounds per cubic foot, the amount of said liquid foaming agent being usch as to provide a relatively dense, microcellular, integral skin on the surface portions of said body having a thickness of the order of one to three millimeters, heating said mold at a temperature of 100° to 175° F. until the molded foam body, integral skin article is sufficiently structurally self-sustaining to be removed from said mold, and then removing said article from said mold.

3. In the process of producing a relatively low density, open cell polyurethane resin foam body by reacting a polyisocyanate with a suitable polyol in the presence of a catalyst and a liquid foaming agent which is vaporizable by the exothermic heat of reaction of said polyisocyanate and polyol, the improvement wherein a relatively dense microcellular polyurethane skin is formed on surface portions of said foam body, the thickness of said skin being generally independently controllable with respect to the density of said foam body, comprising providing a polymerizable mixture of said polyisocyanate, polyol and catalyst containing about one and one-third to three times the maximum amount of said vaporizable liquid foaming agent that could be combined with the proportions of said polyisocyanate, polyol and catalyst in said mixture to produce a structurally stable, free-rise foam therefrom having a density in the range of about one and one-half to ten pounds per cubic foot, said polymerizable mixture thus not being capable of forming a stable, free-rise foam because of its said content of said foaming agent, adding a predetermined amount of said polymerizable mixture at a temperature of about 70° to 85° F. to a closable mold which has been preheated to a temperature of about 100° to 175° F. and immediately closing said mold, said mixture undergoing polymerization and evolving heat, said liquid foaming agent vaporizing to expand the polymerizing mixture to completely fill the cavity of said mold, said predetermined amount of polymerizable mixture being sufficient to provide a molded cellular polyurethane body having a core density of about one and one-half to ten pounds per cubic foot, the amount of said liquid foaming agent being such as to provide a relatively dense, microcellular, integral skin on the surface portions of said body having a thickness of the order of one to three millimeters, heating said mold at a temperature of 100° to 175° F. until the molded foam body, integral skin article is sufficiently structurally self-sustaining to be removed from said mold, the pressure in said mold not exceeding two atmospheres gauge pressure, and then removing said article from said mold.

References Cited

UNITED STATES PATENTS

| | | | |
|---|---|---|---|
| 3,521,604 | 7/1970 | Nickel | 260—2.5 AZ |
| 3,182,104 | 5/1965 | Cwik | 264—54 X |
| 3,178,490 | 4/1965 | Petrino | 264—41 |
| 3,099,516 | 7/1963 | Henrickson | 264—48 |
| 3,511,736 | 5/1970 | Nielsen | 264—45 X |

DONALD J. ARNOLD, Primary Examiner

P. A. LEIPOLD, Assistant Examiner

U.S. Cl. X.R.

260—2.5 AZ; 264—48, DIG 14